Jan. 29, 1963　　　E. C. ELSNER　　　3,075,270
CHAIN LOAD BINDER
Filed March 19, 1958
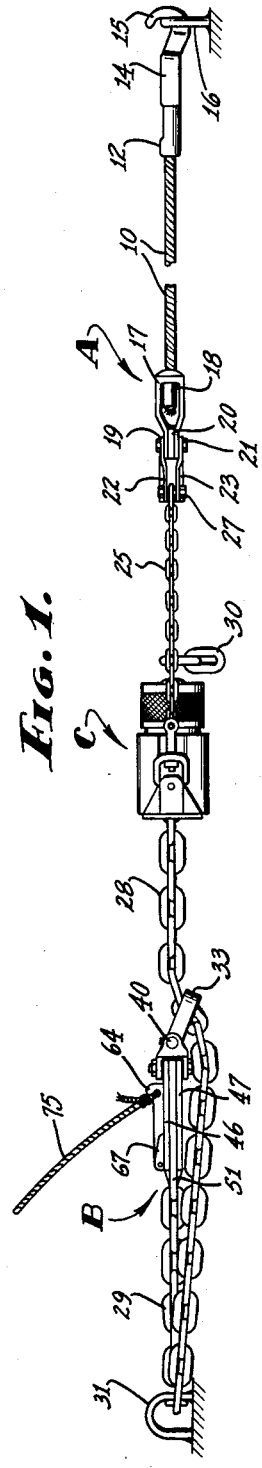
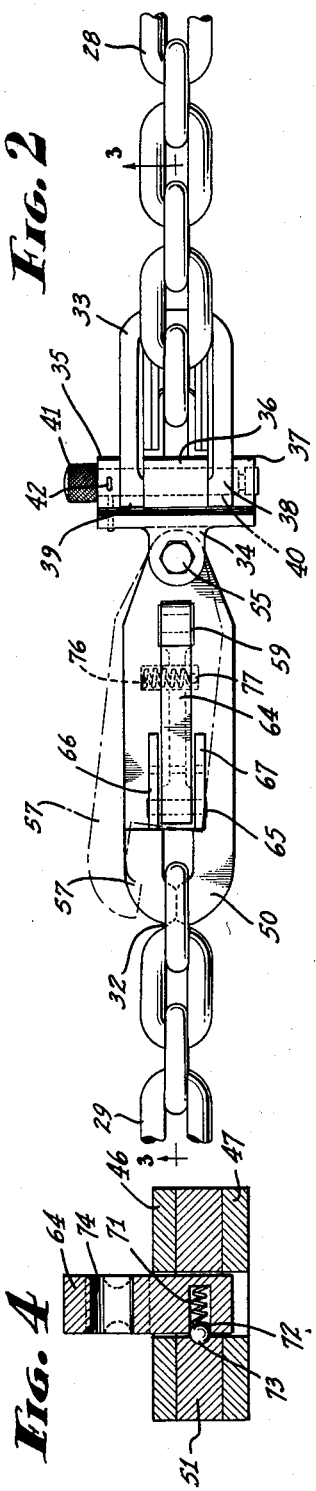
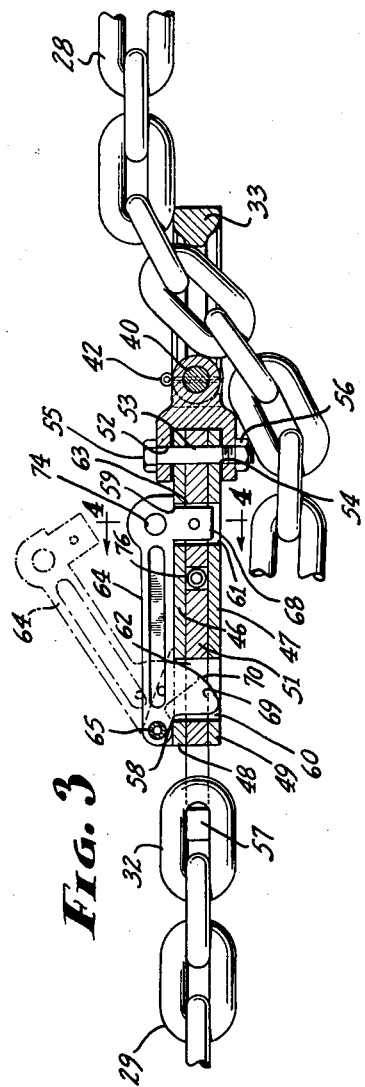
INVENTOR.
EDWIN C. ELSNER

United States Patent Office 3,075,270
Patented Jan. 29, 1963

3,075,270
CHAIN LOAD BINDER
Edwin C. Elsner, Los Angeles County, Calif., assignor to Aeroquip Corporation, Jackson, Mich., a corporation of Michigan
Filed Mar. 19, 1958, Ser. No. 722,600
4 Claims. (Cl. 24—230)

This invention relates to improvements in cargo fastening devices for tying down, tensioning and quick releasing bulky load structures.

It is a primary object of this invention to provide a rugged, flexible, jack operated cargo tie-down mechanism which can be easily positioned and operated by one man.

Another object of this invention is to provide an improved cargo tie-down device which can flexibly engage, apply tension to and be quickly released from bulky load structures.

It is a further object of this invention to provide an improvement in cargo tie-down devices which is particularly suited for tying down bulky load structures in a quick releasable manner and at the same time permitting use of a detachable tension applying jack member.

It is a still further object of this invention to provide a cargo device which includes dual flexible tie-down members including a chain element which are connected by a detachable jack operated chain advancing and positive chain retaining mechanism, and safety mechanism capable of releasing said chain tie-down element without affecting said chain advancing and retaining means.

Yet another object of the invention is to provide an association of flexible anchoring element, link chain attachment and release member, and positive chain retarding mechanism that will dispose said retarding mechanism in position for ready detachable connection of a jack member.

Further objects and advantages of the invention will appear in connection with the description of the illustrative embodiment shown in the accompanying drawings, wherein FIGURE 1 is a side elevation of the invention with the associated parts in connected relationship.

FIGURE 2 is an enlarged plan view of the link chain attachment and release element.

FIGURE 3 is a section taken on the line 3—3 of FIGURE 2.

FIGURE 4 is a section taken on the line 4—4 of FIGURE 3.

There are many presently available tie-down and fastening devices for bulky cargo loads, but none of these devices are suitable for the use to which the present invention is intended. When heavy, unevenly proportioned cargo loads are transported in ships, airplanes, truck or freight cars, there are many problems involved. The facility with which these various loads are initially secured is of course important. The manner in which the tied down cargo stands travel movement again raises serious questions of stability and safety. Also, bulky cargo, because of its size and weight, presents an inherently dangerous structure and requires safe securement, tensioning and release mechanism for containment initially, during travel movement and when unloaded.

With the present invention, however, because of its flexibility and adaptability to uneven bulky loads, the operator may quickly anchor the device, readily secure an opposed attachment chain end in such manner that it may be quickly released when and if necessary, and finally bring the flexible elements to a positive tied down position by the actuation of a jack chain advancing and retarding mechanism. Rather, the present invention is expressly adapted to quickly tie down cargo, maintain and adjust tension if necessary and provide safe release thereof.

In addition to the aforementioned advantages of the present device over those heretofore used, the present invention disposes the manually operated portions thereof in a position to be readily and safely operated.

A preferred embodiment of the present invention comprises three main elements (FIGURE 1) referred to generally as A, B, and C. A refers to a flexible cargo tie-down and anchoring member. B refers to a link chain tie-down and release mechanism, and C refers to a chain retaining mechanism fixedly connected to A and releasably secured to B. A manually actuated detachable jack (not shown) provides means for step by step advancement of link chain through said chain retarder to positive tensioned position.

The flexible tie-down and anchoring element A includes in this instance a cable 10 which may be any desired length to properly secure the cargo or comparable structures or devices to be contained. The outer end of cable 10 is conventionally connected by means of enlargement 12 to spread arms 14 of hook 15. Hook 15 engages any permanent fastener or attachment member 16. The opposite end of flexible tie-down cable 10 is shown in FIGURE 1 as disposed in a straight line but this is not the case in actual use because said flexible cable 10 is obviously tossed over or disposed about the usually bulky load in a manner to the properly support and hold same. A conventional apertured cable grip 17 receives the opposite end of cable 10 and secures the enlarged attachment end 18 thereof. The divided rear ends 19 of cable grip 17 are clamped and bolted at 20 and 21 respectively to the forward ends of dual anchor plates 22 and 23. This bolted connection is sufficiently loose to insure the desired flexibilty desired at all times. Dual bridle chains, one of which is shown at 25, are secured at their forward ends to anchor plates 22 and 23 in spaced relation by means of the bolted connections, one of which is shown at 27. The rear ends of bridle chains are adapted for fixed operative connection with said previously referred to chain retarding and retaining mechanism C.

An opposed link chain tie-down and release mechanism previously referred to as B includes a link chain 28 of relatively short length. FIGURE 1 of the drawings clearly discloses the connected elements of the flexible cargo tie-down for illustrative purpose but in actual use these elements surround usually a bulky load and it is intended that the link chain attachment and release mechanism be within easy reach of the sole operator. Therefore, the chain attachment and quick release mechanism now to be described is disposed adjacent the outer end 29 of link chain 28, the inner end 30 thereof being received in the chain retaining mechanism C. The outer link chain end 29 is looped through a permanent fastening 31 and the final link 32 thereof brought to a position of optional connection and release with manually operable quick release mechanism which comprises a chain link grip 33. Chain link grip 33 has optional, detachable connection on the chain but for actual displacement manual manipulation of parts is necessary. Chain link grip 33 is the support and anchor for the chain attachment and quick release mechanism and is connected thereto in the following manner. A bracket 34 has three rearwardly extending spaced ears 35, 36 and 37 respectively. These ears 35, 36 and 37 are bored to coincide with similar openings in the spaced ends 38 and 39 of chain link grip 33, and said chain link grip 33 and bracket 34 are connected by means of rod 40 engaging said described coinciding bored portions. Rod 40 has a knurled enlarged end 41 and is safely captured in said supporting bores by means of cotter key 42. It will be noted that chain link grip 33 (FIGURE 1) is pivotally mounted with respect to bracket 34 and will tend to hold the chain attachment and quick release mechanism, now to be described, in a readily attachable and quickly releasable position with respect to the operator.

The chain attachment and quick release mechanism (element B) has three important functions, one being to latch the flexible but not elastic cable 10 and chain 28 on and about the bulky cargo prior to the final tensioning operation. Another is to provide a quick and safe release of said latching device when and if required. The third function is to hold the bulky cargo in tensioned position. This mechanism must withstand tremendous pressures and therefore is constructed of heavy steel elements which include dual overlapping, coinciding, spaced plates 46 and 47. Plates 46 and 47 have their outer ends 48 and 49 respectively, clamped together to form jaw member 50. An intermediate plate 51 of about double the thickness of plates 46 and 47 and filling the intermediate space therebetween has the same pivotal mounting as said plates 46 and 47 with bracket 34 pivotally connected to chain link grip 33. The said pivotal mounting includes coinciding apertures 52, 53 and 54 in plates 46, 51 and 47 respectively, threaded bolt 55 and nut 56. A bushing may be used at this joint if desired. Plate 51 obviously folds into spaced plates 46 and 47, the outer end thereof forming a jaw similar to and abutting jaw 50 of spaced plates 46 and 47. Heavy plates 46, 47 and 51 are obviously adapted to be held in an interlocked relationship and therefore in plate 46, there are formed forward and rearward slots 58 and 59 respectively. Said slots 58 and 59 find coinciding spaced similar slots 60 and 61 on lower plate 47 respectively. On intermediate plate 51 are formed forward aperture 62 and rearward aperture 63 which coincide with the before mentioned slots in said spaced plates 46 and 47.

The means for optionally engaging said above described coinciding separated slots comprises a latch 64 which is pivotally mounted on hollow pin 65 pressed into openings in spaced ears 66 and 67 on the upper surface of the plate 46 adjacent slot 58. Latch 64 has two depending lugs 68 and 69 respectively, lug 68 being adapted to engage coinciding slots 59, 63 and 61 and lug 69 being adapted to engage slots 58, 62 and 60. Lug 68 is substantially rectangular in shape and being on the outer end of latch 64 readily engages the coinciding slots but lug 69 being immediately adjacent the pivot 65 is curved at 70 to permit ready engagement with and withdrawal from said coinciding slots 58, 62 and 60. A spring 71 loaded ball detent 72 is carried in lug 68 of latch 64 and when engaging a coinciding notch 73 formed in the side of plate 51 tends to hold said latch from accidental displacement or removal. A lanyard hole 74 is formed in latch 64 which obviously provides means for attaching lanyard 75 and thus manual quick release of the powerful jaws 50 and 57 from a safe distance. A spring loaded slot 76 which is cut out of plate 51 and through pin 77 are provided to limit the outward travel of plate 51 and jaw 57 when released. Pin 77 is carried by both plates 46 and 47 and extends through the slot 76. It is apparent that this powerful mechanism is absolutely necessary to insure safe securement of the link chain and operatively associated cable anchor elements when tensioned on bulky cargo, but the shape of jaws 50 and 57 insures instantaneous release of the chain end when the quick or safety release is manually actuated.

Flexible cable anchoring element A and chain attachment and quick release mechanism B are operatively associated and connected by means of said chain retaining mechanism C.

The chain retaining mechanism C is preferably of the type shown and described in my U.S. Patent No. 2,973,566 utilizing a hydraulic jack.

The operation of the device is relatively simple. There has been little opportunity in the drawings to illustrate the use of the present invention in connection with bulky, heavy cargo or other comparable structures. However, it is intended that the present device be used to contain inherently dangerous loads. Therefore, a flexible load containing cable and anchor member A is first secured to a permanent fastener and the flexible cable or chain if desired, is drawn manually over or about the load depending upon use and condition. The operator then loops the end of chain 28 through the permanent fastener and brings the final link 32 between the jaws 50 and 57 of the locking and quick release member suitably supported by chain link grip 33. When desired, the position of the locking and release mechanism may be changed by manual detachment of chain link grip 33. The opposite end 30 of chain 28, if not previously disposed in chain retainer C, is now pulled therethrough. A certain degree of manual initial tension may be applied to the device as a whole but the powerful tension applying means of the type shown in the referenced patent is, of course, required.

The removal of tension or rather the release of the flexible tie-down devices as a whole, whether normally or as a safety measure, is accomplished by releasing the safety latch 64 by means of lanyard 75. A tumbling inherently dangerous load can be released with absolute safety with the present device. The initial tie-down, pull-up and final tension is accomplished in not only a safe but quick manner by a single operator.

It will thus be seen that there has been provided by this invention structure in which the various objects hereinbefore set forth, together with many practical advantages are successfully achieved. As various possible embodiments may be made of the individual features of the above invention, all without departing from the scope thereof, it is to be understood that all matter hereinbefore set forth or shown in the accompanying drawings is to be interpreted as illustrations, and not in a limiting sense.

I claim:

1. In a cargo tie-down mechanism, a quick release device adapted to be connected between opposing portions of said mechanism, said device comprising first and second plate means disposed in overlying relation and pivotally connected together, each of said plate means having a jaw portion formed at one end and spaced from said pivotal connection, said jaw portions mating in a first position of said first and second plate means to form a closed jaw structure and being positionable in a second position to form an open jaw structure, means forming aligned openings in said first and second plate means when said plate means are in said first position, a latch pivotally mounted at one end on one of said plate means and being swingable away from said plate means in a plane substantially perpendicular to said plate means, and a lug fixed on said latch and being positioned within said aligned openings to lock said plate means in said first position, said latch when pivoted away from said plate means moving said lug out of said aligned openings thereby unlocking said first and second plate means and allowing relative movement of said plate means to said second position.

2. The subject matter of claim 1 wherein said latch is substantially parallel to said plate means when said lug is positioned within said aligned openings.

3. The subject matter of claim 2 including releasable fastening means interconnected between one of said plate means and said latch for releasably holding said latch in said parallel position.

4. The subject matter of claim 3 wherein said releasable fastening means includes a second lug on said latch spaced from said first lug and extending into a second set of aligned openings in said first and second plate means.

(References on following page)

References Cited in the file of this patent
UNITED STATES PATENTS

| | | |
|---|---|---|
| 1,632,016 | Woodyard | June 14, 1927 |
| 1,710,092 | Hitchcock | Apr. 23, 1929 |
| 1,900,194 | Niemi | Mar. 7, 1933 |
| 2,293,653 | Katz | Aug. 18, 1942 |
| 2,300,372 | Ralston | Oct. 27, 1942 |
| 2,426,099 | Hershowitz | Aug. 19, 1947 |
| 2,604,678 | Mayes | July 29, 1952 |
| 2,699,586 | Dorsey et al. | Jan. 18, 1955 |
| 2,715,012 | Huber | Aug. 9, 1955 |
| 2,759,235 | Rea | Aug. 21, 1956 |
| 2,784,938 | Huber | Mar. 12, 1957 |
| 2,797,891 | MacCluney | July 2, 1957 |
| 2,903,767 | Huber | Sept. 15, 1959 |
| 2,904,347 | Tucker | Sept. 15, 1959 |